United States Patent
Liu (10) Patent No.: US 11,824,950 B2
(45) Date of Patent: Nov. 21, 2023

(54) SUBSCRIPTION INFORMATION UPDATE METHOD AND APPARATUS

(71) Applicant: ZTE Corporation, Guangdong (CN)

(72) Inventor: Helun Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/989,777

(22) Filed: Aug. 10, 2020

(65) Prior Publication Data

US 2021/0112129 A1 Apr. 15, 2021

Related U.S. Application Data

(63) Continuation of application No. PCT/CN2019/074848, filed on Feb. 12, 2019.

(30) Foreign Application Priority Data

Feb. 13, 2018 (CN) .......................... 201810149926.5

(51) Int. Cl.
*H04L 67/51* (2022.01)
*H04L 41/5054* (2022.01)
*H04W 8/20* (2009.01)

(52) U.S. Cl.
CPC .......... *H04L 67/51* (2022.05); *H04L 41/5054* (2013.01); *H04W 8/20* (2013.01)

(58) Field of Classification Search
CPC ...... H04L 67/16; H04L 41/5054; H04W 8/20; H04W 4/50; H04W 36/0033; H04W 8/18; H04W 8/06; H04W 8/14; H04W 36/0011
See application file for complete search history.

(56) References Cited

U.S. PATENT DOCUMENTS

2015/0358248 A1 12/2015 Saha et al.
2018/0098251 A1* 4/2018 Li ..................... H04W 36/0016
(Continued)

FOREIGN PATENT DOCUMENTS

CN 103765951 A 4/2014
CN 105247909 A 1/2016
(Continued)

OTHER PUBLICATIONS

3GPP: "Procedures for the 5G System, Stage 2 (Release 15)" Technical Specification group Services and System Aspects; 3GPP TS 23.502; V15.0.0; Dec. 2017; Valbonne, France (17 pages).

(Continued)

*Primary Examiner* — Charles C Jiang
*Assistant Examiner* — Shawn D Miller
(74) *Attorney, Agent, or Firm* — Foley & Lardner LLP (57) ABSTRACT

Provided are a method and apparatus for updating subscription information. The method includes steps described below. After a second NF transfers first subscription information to a third NF, where the first subscription information includes a first correlation identity allocated by the second NF to a first NF, the third NF allocates a second correlation identity to the first NF, and the third NF receives update subscription information of the first NF, where the update subscription information includes the second correlation identity. By using the above scheme, the issue of the lack of an update scheme of the subscription information adaptable a new system in the related art is resolved, and the update scheme of the subscription information adaptable the new system is proposed, for example, when across-NF registration of the user terminal is generated, the subscription message is updated between the new third NF and the first NF in time.

16 Claims, 6 Drawing Sheets

(56) References Cited

U.S. PATENT DOCUMENTS

| | | | | |
|---|---|---|---|---|
| 2019/0182875 A1* | 6/2019 | Talebi Fard | ............ | H04W 8/18 |
| 2019/0191467 A1* | 6/2019 | Dao | ...................... | H04W 76/10 |
| 2019/0254108 A1* | 8/2019 | Iwai | ...................... | H04W 88/08 |

FOREIGN PATENT DOCUMENTS

| | | |
|---|---|---|
| CN | 105264948 A | 1/2016 |
| CN | 107018542 A | 8/2017 |
| EP | 3 780 682 A1 | 2/2021 |

OTHER PUBLICATIONS

China Mobile: "23.502 Description update on AMF service description to support T-ADS query" SA WG2 Meeting #122; S2-174217; Jun. 30, 2017; San Jose Del Cabo, Mexico (4 pages).

First Office Action for JP Appl. No. 2020-565007, dated Nov. 1, 2021 (with English translation, 9 pages).

First Office Action for KR Appl. No. 10-2020-7026249, dated Nov. 9, 2021 (with English translation, 10 pages).

First Chinese Office Action on CN 201810149926.5 dated Jun. 7, 2021 (6 pages).

Huawei et al.: "Terminology rationalisation and SLA simplification for network slicing", 3GPP SA WG2 Meeting #124; S2-179433; Dec. 1, 2017; Reno, USA (15 pages).

3rd Generation Partnership Project: "Technical Specification Group Services and System Aspects"; Procedures for the 5G System; Stage 2 (Release 15) 3GPP TS 23.502 VI5.0.0, Dec. 31, 2017 (Dec. 31, 2017), (258 pages).

Hua Wei et al.: "Discussion on the Monitoring Event Subscription to a Group" 3GPP TSG-SA2 Meeting #129, S2-1810485, Oct. 19, 2018 (Oct. 19, 2018), Dongguan, P.R. China (1 page).

International Search Report for PCT Appl. No. PCT/CN2019/074848 dated May 8, 2019 (with English translation, 5 Pages).

Nokia et al.: "Improvements on the Specification of the Subscription to Network Exposure" SA WG2 Meeting #125, S2-180131, Jan. 26, 2018 (Jan. 26, 2018), Gothenburg, Sweden (19 pages).

3rd Generation Partnership Project: Technical Specification Group Core Network and Terminals; Study on CT WG3 Aspects of 5G System—Phase 1; Stage 3 (Release 15) 3GPP TR 29.890 V1.1.0; Nov. 8, 2017; Valbonne, France (127 pages).

3rd Generation Partnership Project: "Technical Specification Group Services and System Aspects; System Architecture for the 5G System; Stage 2 (Release 15)", 3GPP TS 23.501 V15.0.0; Dec. 2017; Valbonne, France (181 pages).

Extended European Search Report for EP Appl. No. 19754005.7, dated Oct. 21, 2021 (13 pages).

Huawei et al., "Pseudo CR on TS 23.502 for updating registration procedures with NF service operation invocations" SA WG2 Meeting #122, S2-174161, Jun. 30, 2017, San Jose Del Cabo, Mexico (16 pages).

LG Electronics, "Clarification on PCF association" 3GPP TSG-SA WG2 Meeting #125, S2-181050, Jan. 26, 2018, Gothenburg, Sweden (16 pages).

Second Office Action for CN Appl. No. 201810149926.5, dated Jan. 11, 2022 (with English translation, 64 pages).

* cited by examiner

SUBSCRIPTION INFORMATION UPDATE METHOD AND APPARATUS

CROSS-REFERENCE TO RELATED APPLICATIONS

This application claims the benefit of priority under 35 U.S.C. § 120 as a continuation of PCT Patent Application No. PCT/CN2019/074848, filed on Feb. 12, 2019, which claims priority to Chinese Patent Application No. 201810149926.5, filed on Feb. 13, 2018, the disclosure of each of which is incorporated herein by reference in its entirety.

TECHNICAL FIELD

The present disclosure relates to communications and, specifically, to a method and apparatus for updating subscription information.

BACKGROUND

In the related art, when a new radio (NR) 5G protocol requires a user to register across a net function (NF), the previously registered Old NF needs to transfer subscription information to the newly registered New NF of the user. The subscription information transferred from the Old NF directly used by the New NF includes a subscription correlation identity (ID). The subscription correlation ID is used for identifying a current subscription relationship and is allocated by the NF (provider of the subscription information) and is unique within each NF, and carries the current subscription relationship to a consumer NF in a subscription response message. The subscription correlation ID and the current subscription are associated by the consumer NF, and subsequent notification messages for the current subscription (NF Notifies a Consumer NF Subscription Event) or canceling/modifying the current subscription, which carries the identity (abbreviated as ID).

However, the New NF directly uses the Subscription Correlation ID allocated by the Old NF, which may not ensure that the Subscription Correlation ID is unique in the New NF, and may cause Old NF to fail to recover the Subscription Correlation ID in time.

No efficient scheme has been provided to resolve the issue of the lack of an update scheme of the subscription information adaptable a new system in the related art.

SUMMARY

Embodiments of the present disclosure provide a method and apparatus for updating subscription information to at least resolve the issue of the lack of an update scheme of the subscription information adaptable a new system in the related art.

A method for updating subscription information is provided in an embodiment of the present disclosure. The method includes steps described below. A third net function (NF) receives first subscription information sent by a second NF, where the first subscription information includes a first correlation identity allocated by the second NF to a first NF; the third NF allocates a second correlation identity to the first NF, and then sends the second correlation identity to the first NF; and the third NF receives an update subscription message of the first NF, where the update subscription message includes the second correlation identity.

A method for updating subscription information is provided in another embodiment of the present disclosure. The method includes steps described below. A first net function (NF) establishes a subscription relationship with a second NF; the first NF receives a second correlation identity allocated by a third NF, where the third NF allocates the second correlation identity to the first NF after receiving first subscription information carrying the subscription relationship sent by the second NF; and the first NF sends an update subscription message to the third NF, where the update subscription message includes the second correlation identity.

An apparatus for updating subscription information is provided in another embodiment of the present disclosure. The apparatus includes a first receiving module, a first sending module and a second receiving module. The first receiving module is configured to receive first subscription information sent by a second NF, where the first subscription information includes a first correlation identity allocated by the second NF to a first NF. The first sending module is configured to: allocate a second correlation identity to the first NF, and the send second correlation identity to the first NF. The second receiving module is configured to receive an update subscription message of the first NF, where the update subscription message includes the second correlation identity.

An apparatus for updating subscription information is provided in another embodiment of the present disclosure. The apparatus includes an establishment module, a third receiving module and a second sending module. The establishment module is configured to establish a subscription relationship with a second NF. The third receiving module is configured to receive a second correlation identity allocated by a third NF, where the third NF allocates the second correlation identity to an NF to which the third receiving module belongs after receiving first subscription information carrying the subscription relationship sent by the second NF. The second sending module is configured to send an update subscription message to the third NF, where the update subscription message includes the second correlation identity.

According to another embodiment of the present disclosure, a storage medium is further provided. The storage medium stores a computer program. When the computer program is executed, the steps in any one of the preceding method embodiments are performed.

According to another embodiment of the present disclosure, an electronic device is further provided. The electronic device includes a memory and a processor. The memory stores a computer program. The processor is configured to execute the computer program to perform the steps in any one of the preceding method embodiments.

BRIEF DESCRIPTION OF DRAWINGS

The drawings described herein are used to provide a further understanding of the present disclosure and form a part of the present application. The illustrative embodiments and the description thereof in the present disclosure are used to explain the present disclosure and not to limit the present disclosure in an improper manner. In the drawings.

DETAILED DESCRIPTION

The present disclosure will be hereinafter described in detail with reference to drawings in conjunction with embodiments. It is to be noted that if not in collision, the embodiments described herein and the features in the embodiments may be combined with each other.

It is to be noted that the terms "first", "second" and the like in the description, claims and above drawings of the present disclosure are used to distinguish between similar objects and are not necessarily used to describe a particular order or sequence.

An embodiment of the present application provides a mobile communication network (which includes, but is not limited to a 5th generation (5G) mobile communication network). The network architecture of this network may include a network side device (such as a base station) and a terminal. An information transmission method executable on the above network architecture is provided in the embodiment. It is to be noted that an execution environment of the above information transmission method provided by the embodiment of the present application is not limited to the above network architecture.

When a user terminal is registered across a Net Function (NF), a third NF in the present application may be a new registered provider NF, a second NF may be an old registered provider NF, and a first NF may be a consumer NF.

Embodiment One

Figure 1:
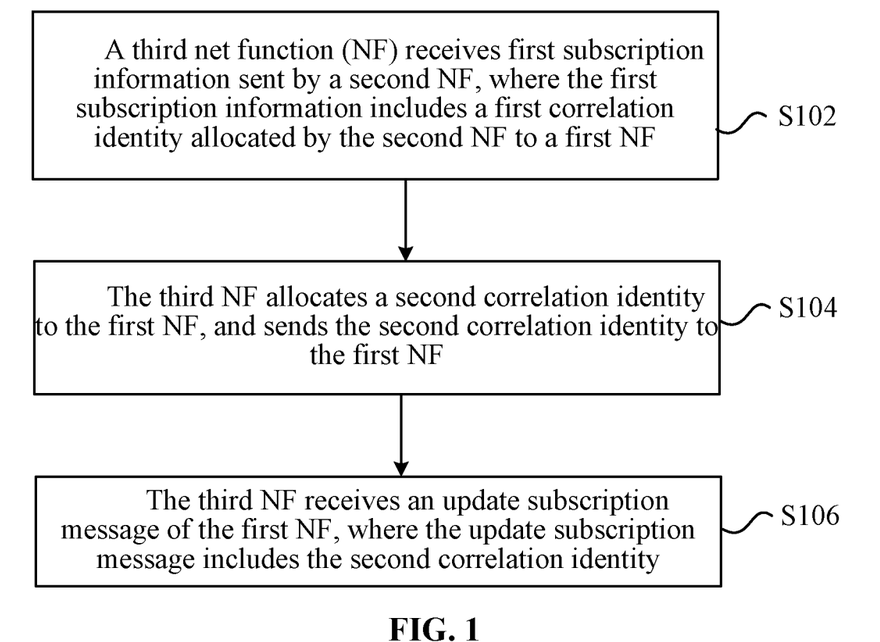
FIG. 1 is a flowchart of a method one for updating subscription information applied at a third NF side according to an embodiment of the present disclosure.

In the present embodiment, a method for updating subscription information executed on the network architecture described above is provided. FIG. 1 is a flowchart of a third NF side of a method one for updating subscription information according to an embodiment of the present disclosure. As shown in FIG. 1, the method includes steps described below.

In step S102, a third net function (NF) receives first subscription information sent by a second NF, where the first subscription information includes a first correlation identity allocated by the second NF to a first NF.

In step S104, the third NF allocates a second correlation identity to the first NF, and sends the second correlation identity to the first NF.

In step S106, the third NF receives an update subscription message of the first NF, where the update subscription message includes the second correlation identity.

Optionally, in the above embodiment, the first NF is a consumer NF and subscribes to an event of a user equipment (UE) on the second NF. Subsequently, the second NF transfers user information to a new third NF, and a subscription message is updated between the third NF and the first NF.

In addition, the above correlation identity may be a subscription correction ID.

Through the above steps, after the second NF transfers the first subscription information to the third NF, the first subscription information includes the first correlation identity allocated by the second NF to the first NF, the third NF allocates the second correlation identity to the first NF. Therefore, the issue of the lack of an update scheme of the subscription information adaptable a new system in the related art is resolved, and the update scheme of the subscription information adaptable the new system is proposed, for example, when across-NF registration of the user terminal is generated, the subscription message is updated between the new third NF and the first NF in time.

In one embodiment, step S102, step S104 and step S106 may be executed in a reverse order, that is, step S104 may be executed before step S102.

Optionally, the second correlation identity is sent to the first NF, and the method includes sending, by the third NF, a first notification message to the first NF, where the first notification message carries the second correlation identity.

Optionally, the second correlation identity is sent to the first NF, and the method includes steps described below. The third NF sends a second notification message to the first NF, where the second notification message is configured to notify the first NF to send re-subscription information to the third NF. The re-subscription information sent by the first NF is received. The third NF sends a subscription response to the first NF according to the re-subscription information, where the subscription response includes the second correlation identity.

Optionally, the first NF includes a consumer NF, the second NF includes an origin provider NF, and the third NF includes a destination provider NF.

Optionally, the third NF sends at least one piece of information to the first NF, where the information includes an identity (ID) of the third NF, a subscription event in the first subscription information and target content of the first NF indicated by the first subscription information. It should be noted that the target content may be content of interest to the first NF.

Optionally, after the third NF receives the first subscription information sent by the second NF, the second NF cancels a subscription relationship between the first NF and the second NF.

Figure 2:
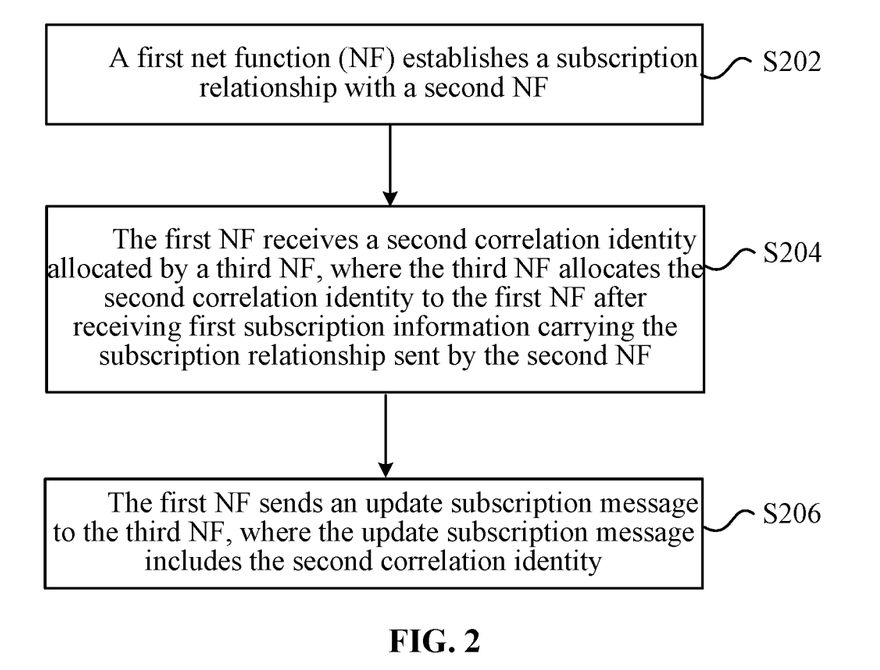
FIG. 2 is a flowchart of a method one for updating subscription information applied at a first NF side according to an embodiment of the present disclosure.

Another embodiment of the present disclosure further provides a method for updating subscription information. FIG. 2 is a flowchart of a method one for updating subscription information applied at a first NF side according to an embodiment of the present disclosure. As shown in FIG. 2, the method includes steps described below.

In step S202, a first net function (NF) establishes a subscription relationship with a second NF.

In step S204, the first NF receives a second correlation identity allocated by a third NF, where the third NF allocates the second correlation identity to the first NF after receiving first subscription information carrying the subscription relationship sent by the second NF.

In step S206, the first NF sends an update subscription message to the third NF, where the update subscription message includes the second correlation identity.

Optionally, the first NF receives the second correlation identity allocated by the third NF, and the method includes receiving a first notification message carrying the correlation identity sent by the third NF.

Figure 3:
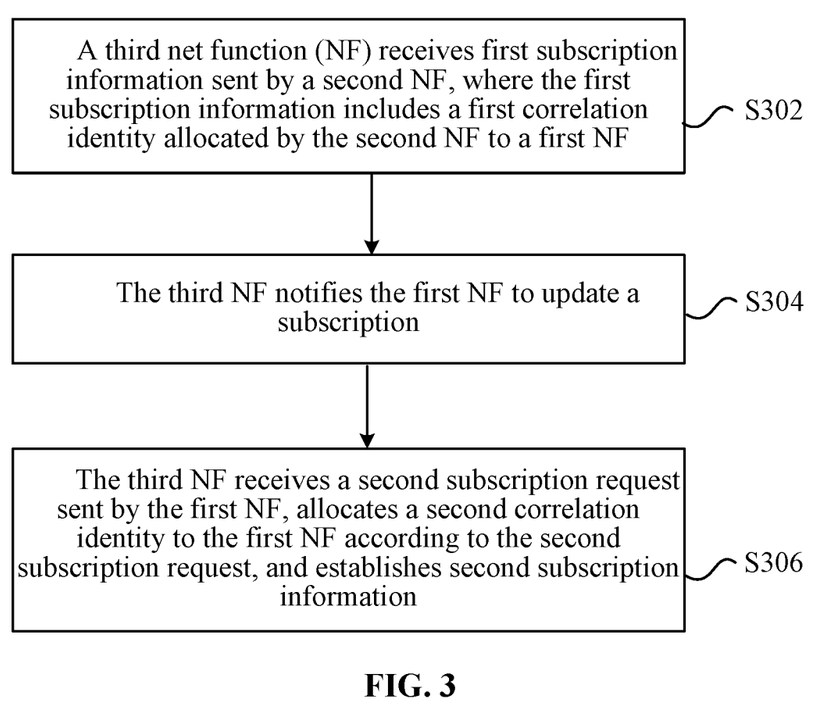
FIG. 3 is a flowchart of a method three for updating subscription information applied at the third NF side according to an embodiment of the present disclosure.

Optionally, the first NF receives the second correlation identity allocated by the third NF, and the method includes steps described below. The third NF sends a second notification message to the first NF, where the second notification message is configured to notify the first NF to send re-subscription information to the third NF. The re-subscription information sent by the first NF is received. The third NF sends a subscription response to the first NF according to the re-subscription information, where the subscription response includes the second correlation identity. Another embodiment of the present disclosure further provides a method for updating subscription information. FIG. 3 is a flowchart of a method two for updating subscription information applied at a third NF side according to an embodiment of the present disclosure. As shown in FIG. 3, the method includes steps described below.

In step S302, a third net function (NF) receives first subscription information sent by a second NF, where the first subscription information includes a first correlation identity allocated by the second NF to a first NF.

In step S304, the third NF notifies the first NF to update a subscription.

In step S306, the third NF receives a second subscription request sent by the first NF, allocates a second correlation identity to the first NF according to the second subscription request, and establishes second subscription information.

Optionally, the user equipment has previously registered the first NF.

Optionally, the third NF notifies the first NF to update the subscription, for notifying at least one of the contents, and the contents include the updated correlation identity, the updated identity (ID) of the provider NF, a subscription event, and content of interest to the first NF indicated in the first subscription request.

Optionally, after the third NF notifies the first NF corresponding to the subscription information to update the subscription, the second NF receives de-subscription information sent by the first NF, and cancels a subscription relationship between the second NF and the first NF according to the de-subscription information.

Figure 4:
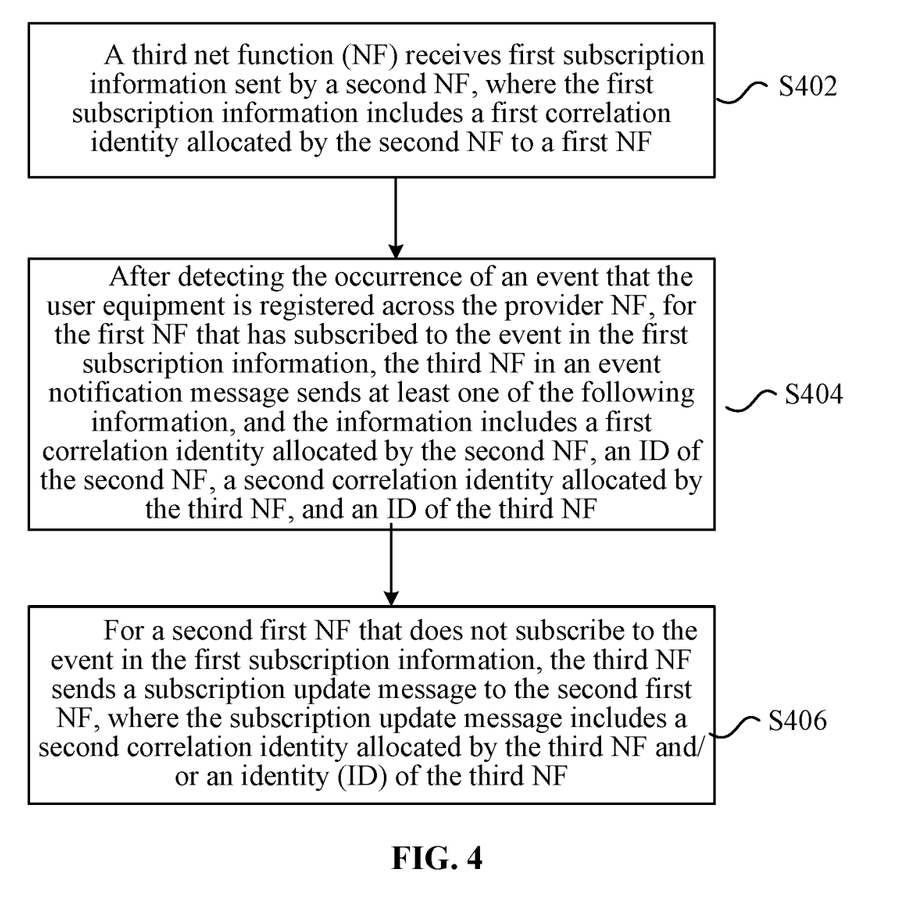
FIG. 4 is a flowchart of a method three for updating subscription information applied at the third NF side according to an embodiment of the present disclosure.

Another embodiment of the present disclosure further provides a method for updating subscription information. FIG. 4 is a flowchart of a method three for updating subscription information applied at a third NF side according to an embodiment of the present disclosure. As shown in FIG. 4, the method includes steps described below.

In step S402, a third net function (NF) receives first subscription information sent by a second NF, where the first subscription information includes a first correlation identity allocated by the second NF to a first NF.

In step S404, after detecting the occurrence of an event that the user equipment is registered across the provider NF, for the first NF that has subscribed to the event in the first subscription information, the third NF in an event notification message sends at least one piece of the information, and the information includes a first correlation identity allocated by the second NF, an ID of the second NF, a second correlation identity allocated by the third NF, and an ID of the third NF.

In step S406, for a first NF that does not subscribe to the event in the first subscription information, the third NF sends a subscription update message to the first NF, where the subscription update message includes a second correlation identity allocated by the third NF and/or an identity (ID) of the third NF.

Figure 5:
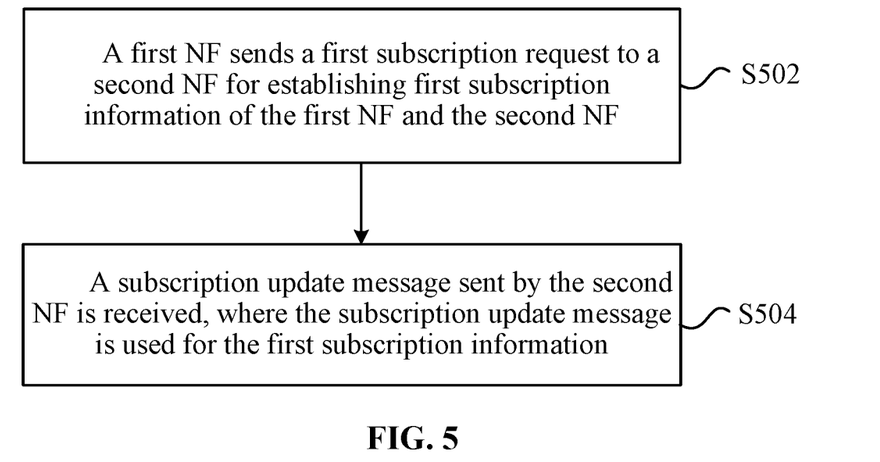
FIG. 5 is a flowchart of a method two or method three for updating subscription information applied at the first NF side according to an embodiment of the present disclosure.

Another embodiment of the present disclosure further provides a method for updating subscription information. FIG. 5 is a flowchart of a method two or 3 for updating subscription information applied at a first NF side according to an embodiment of the present disclosure. As shown in FIG. 5, the method includes steps described below.

In step S502, a first NF sends a first subscription request to a second NF for establishing first subscription information of the first NF in the second NF.

In step S504, a subscription update message sent by the second NF is received, where the subscription update message is used for the first subscription information.

Optionally, the step in which the subscription update message sent by the second NF is received includes steps described below. An indication that the first NF updates the subscription sent by a newly registered third NF is received, where a user equipment corresponding to the first subscription information has an across-NF registration event, and the third NF receives the first subscription information transferred from the second NF. A second subscription request is sent to the third NF for establishing second subscription information of the first NF in the third NF.

Optionally, after the indication that the first NF updates the subscription sent by the newly registered third NF is received, the first NF sends de-subscription information to the second NF for indicating that the second NF cancels a subscription relationship between the second NF and the first NF.

Optionally, the step in which the subscription update message sent by the second NF is received includes one of steps described below. After detecting that the user equipment registers across the NF, and an event that the newly registered third NF receives the first subscription information transferred from the second NF, the first NF that has subscribed to the event in the first subscription information receives an event notification message sent by the third NF, where the event notification message includes at least one of a first correlation identity allocated by the second NF, an ID of the second NF, a second correlation identity allocated by the third NF, and an ID of the third NF. The first NF that does not subscribe to the event in the first subscription information receives the subscription update message sent by the third NF, where the subscription update message includes the second correlation identity allocated by the third NF and/or the ID of the third NF.

The present disclosure will be described below in detail with reference to an optional embodiment. It should be noted that an NF of the present application may be an access and mobility management function (AMF), a session management function (SMF), a policy control function (PCF), a unified data management (UDM), and the like. The following optional embodiment illustrates the present application in detail by taking a cross-AMF registration of a UE as an example, i.e. the third NF is a new AMF newly registered by the user equipment, the second NF is the Old AMF previously registered by the user equipment, both the third NF and the second NF may be referred to as a provider NF, and the first NF is a consumer NF, but the application document is not limited to the across-AMF registration.

When the UE registers across the NF, using a New AMF to directly use a scheme of Subscription Correlation ID allocated by an Old AMF will cause the following three problems:

1. Since an allocation requirement of the Subscription Correlation ID is unique within NF, after a subscription resource of the Old AMF is brought to the New AMF, there is no guarantee that the Subscription Correlation ID is also unique on the New AMF.

2. When a mobility event is reported, the New AMF carries the Subscription Correlation ID allocated by the Old AMF. The Consumer NF will recognize that the user moves to the New AMF and send a message to the New AMF when unsubscribing, thus resulting in the failure to recycle the allocated Subscription Correlation ID resources on the Old AMF.

3. Before the New AMF reports the mobility event and the Consumer NF unsubscribes, the de-subscription message is still sent to the Old AMF, the Old AMF cannot transfer to the New AMF, and the subscription information on the New AMF cannot be cancelled in time.

In view of the problems exist in the above-mentioned transmission of subscription information across-AMF, the present disclosure may adopt any of the following three technical schemes to solve the above-mentioned problems.

Scheme 1 (Scheme 1 here is similar to the method two of the above embodiment): after the subscription information transferred from the Old AMF is received, the New AMF immediately notifies the Consumer NF for all subscriptions, the Consumer NF de-subscribes to the Old AMF and makes a new subscription to the New AMF, and the New AMF allocates its Subscription Correlation ID during a subscription process.

Scheme 2 (Scheme 2 here is similar to the method one of the above embodiment): after the subscription information transferred from the Old AMF is received, the New AMF immediately allocates the Subscription Correlation ID of the New AMF, and sends a subscription update message to a corresponding Consumer NF (may be multiple). The Consumer NF is notified to update the Subscription Correlation ID and an event provider NF ID. The Consumer NF saves and updates the received information and subsequently accepts an event notification from New AMF. Subscription information on the Old AMF is deleted by the Old AMF, and the Consumer NF does not need to send de-subscription to the Old AMF.

Scheme 3 (Scheme 3 here is similar to the method three of the above embodiment): in an across-AMF procedure, after the subscription information brought by the Old AMF is received, the New AMF allocates the Subscription Correlation ID of the New AMF for all subscription relationship, and for the Consumer NF that does not need to trigger a notification event after the end of this process, the New AMF immediately send the subscription update message to update the Subscription Correlation ID of the subscription. However, for the Consumer NF that has subscribed to the event triggered by this procedure, the Consumer NF of the event notification immediately needs to be triggered after the procedure ends, and the event notification message carries the old Subscription Correlation ID and the newly allocated Subscription Correlation ID. In addition to the event notification, the Subscription Correlation ID and the provider NF ID will be updated synchronously.

Further, a subscription update message mechanism of the AMF notifying the Consumer NF is not limited to between AMF and Consumer, and may be used for any common message mechanism in 5G system that serves as a subscription information update of a Provider NF notifying the Consumer NF. The subscription update message mechanism is not only used for notifying the subscription fee Subscription Correlation ID and changes of the information provider NF ID, but also may be used for update other information of the subscription relationship, such as the subscription mobility event information.

The present disclosure will be described below in conjunction with embodiments.

Figure 6:
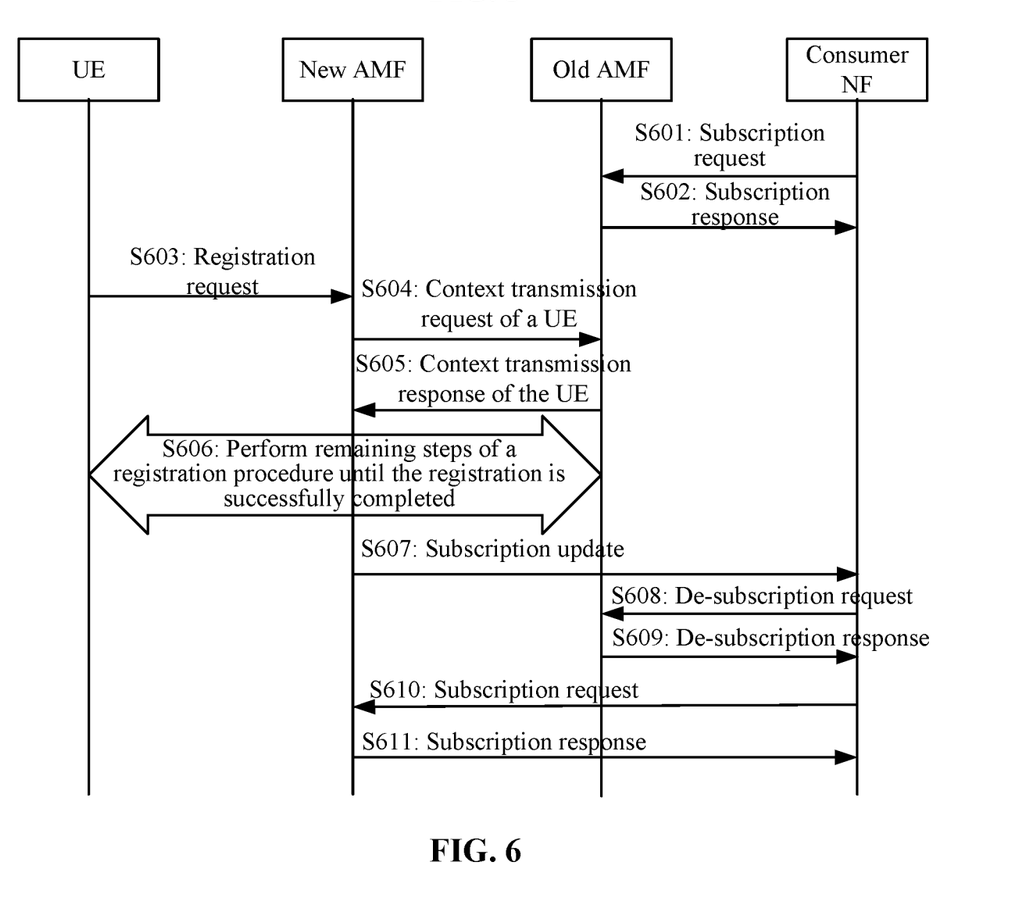
FIG. 6 is a schematic diagram illustrating cross-office movement according to an exemplary embodiment one.

Exemplary Embodiment one: after a cross-office movement, the New AMF updates to the Consumer NF, triggers the Consumer NF to de-subscribe the Old AMF and performs a subscription request to the New AMF.

FIG. 6 is a schematic diagram of cross-office movement according to an exemplary embodiment one. As shown in FIG. 6, steps below are included.

In step S601, the Consumer NF initiates a subscription request to the Old AMF. The Old AMF has allocated a unique Subscription Correlation ID within this AMF for this subscription.

In step S602, the Old AMF replies a response carrying the allocated Subscription Correlation ID, its own NF ID, etc., to the Consumer NF. The Consumer NF receives the response, and all subsequent messages will carry the Subscription Correlation ID.

In step 603, a user location moves and initiates a registration request to an AMF.

In steps S604 and S605, when registering across-AMF, the New AMF requests context information of the UE from the Old AMF. The Old AMF returns a context transmission response of the UE and brings the subscription information, including the Subscription Correlation ID, to the New AMF.

In step S606, remaining steps of a registration procedure are performed until the registration is successfully completed.

In step S607, the New AMF sends a subscription update request carrying the Subscription Correlation ID in the subscription relationship transferred from the Old AMF and the NF ID of the Old AMF to the Consumer NF.

In step S608, the Consumer NF sends a de-subscription request to the Old AMF, and uses the Subscription Correlation ID to indicate the subscription relation.

In step S609, the Old AMF deletes the subscription relationship indicated by the Subscription Correlation ID and returns a de-subscription response to the Consumer NF.

In step S610, the Consumer NF sends the subscription request to the New AMF.

In step S611, the New AMF receives a subscription request of the Consumer NF, allocates a newly Subscription Correlation ID and deletes subscription information transferred from the Old AMF at the same time.

Figure 7:
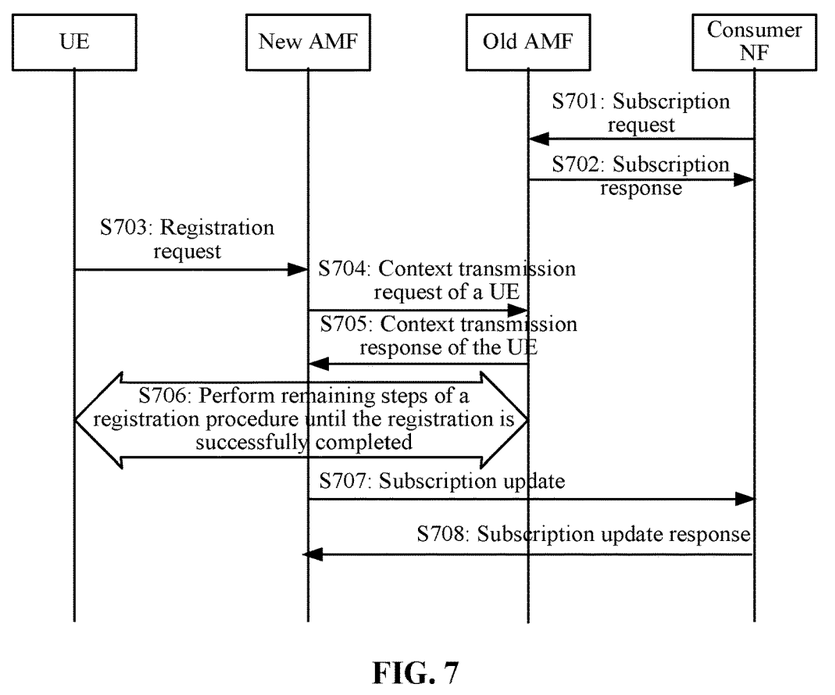
FIG. 7 is a flowchart of updating a subscription relationship by generating an update message from a New Access and Mobility Management Function (AMF) to a Consumer NF according to an exemplary embodiment two.

Exemplary Embodiment two: a New AMF sends an update message to a Consumer NF, and a subscription relationship is updated.

FIG. 7 is a flowchart of updating a subscription relationship by generating an update message from a New AMF to a Consumer NF according to an exemplary embodiment two. As shown in FIG. 7, steps below are included.

In step S701, the Consumer NF initiates a subscription request to an Old AMF. The Old AMF has allocated a unique Subscription Correlation ID within this AMF for this subscription.

In step S702, the Old AMF replies a subscription response carrying the allocated Subscription Correlation ID, its own NF ID, etc., to the Consumer NF. The Consumer NF receives the response, and all subsequent messages will carry the Subscription Correlation ID.

In step 703, a user location moves and initiates a registration request to an AMF.

In steps S704 and S705, when registering across-AMF, the New AMF requests context information of the UE from the Old AMF. The Old AMF feeds back a response according to a context request of the UE and brings the subscription information, including the Subscription Correlation ID, to the New AMF.

In step S706, remaining steps of a registration procedure are performed until the registration is successfully completed.

In step S707, the New AMF allocates a new Subscription Correlation ID, and sends a subscription update request to the Consumer NF, where the message carries the old Subscription Correlation ID in the subscription information transferred from the Old AMF, the NF ID of the Old AMF, the new Subscription Correlation ID allocated by the New AMF and the NF ID of the New AMF.

In step S708, after the subscription update message of New AMF is received, the Consumer NF finds a subscription relationship according to the Old Subscription Correlation ID in the message, updates the Subscription Correlation ID of the provider, and replies a response to the New AMF. The deletion of the subscription relationship on the Old AMF does not require a separate notification from Consumer NF, but the Old AMF deletes the subscription relationship for the user when deleting its user context.

Figure 8:
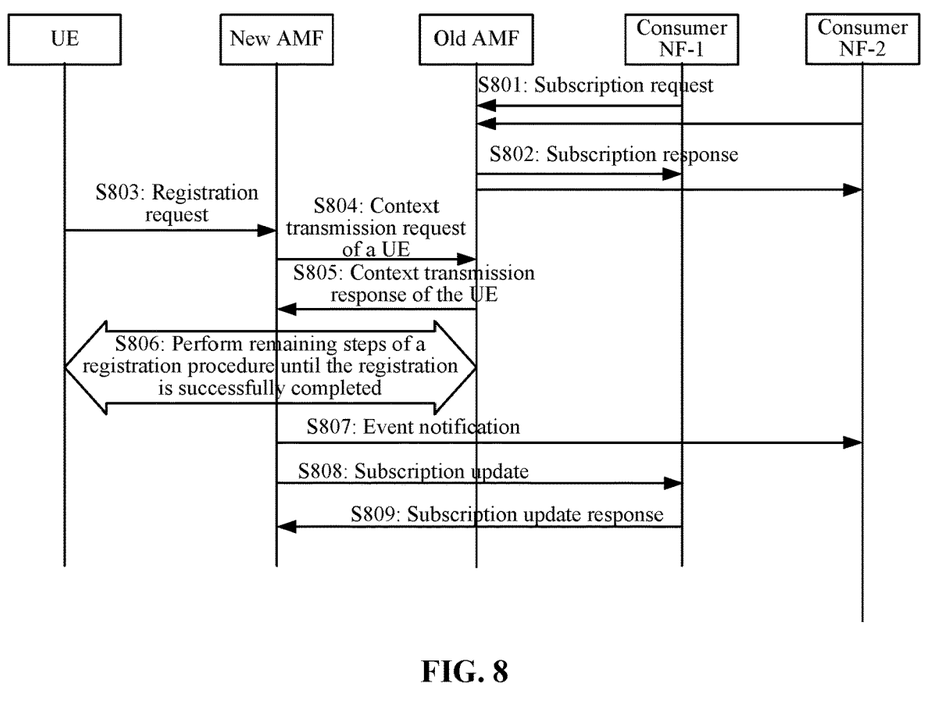
FIG. 8 is a schematic diagram of event communication message according to an exemplary embodiment three.

Exemplary Embodiment three: the New AMF sends an update message to a part of the Consumer NF to update a subscription relationship, and the part of the Consumer NF updates the subscription relationship through an event notification message.

FIG. 8 is a schematic diagram of event communication message according to an exemplary embodiment three. As shown in FIG. 8, steps below are included.

In step S801, a plurality of Consumer NFs initiates a subscription request to an Old AMF, where a Consumer NF-2 subscribes to a movement event related to a user registration. The Old AMF has allocated a unique Subscription Correlation ID within this AMF for each subscription.

In step S802, the Old AMF replies a response carrying the allocated Subscription Correlation ID, its own NF ID, etc., to all Consumer NFs. The Consumer NF receives the response, and all subsequent messages will carry the Subscription Correlation ID.

In step 803, a user location moves and initiates a registration request to an AMF.

In steps S804 and S805, when registering across-AMF, the New AMF requests context information of the UE from the Old AMF. The Old AMF feeds back a response according to a context request of the UE and brings the subscription information, including the Subscription Correlation ID, to the New AMF.

In step S806, remaining steps of a registration procedure are performed until the registration is successfully completed.

In step S807, if the part of Consumer NFs has subscribed to the mobility event generated by a user registration process, the New AMF needs to notify a mobility event of the Consumer NF immediately after the registration is successfully completed. For example, in the present exemplary embodiment, the Consumer NF-2 has subscribed to a mobility event generated by the user registration process, and the New AMF notifies the mobility event of the Consumer NF-2 immediately. However, in this notification event, in addition to the Subscription Correlation ID and NF ID carrying the Old AMF, a Subscription Correlation ID newly allocated by the New AMF and the NF ID of the New AMF need to be carried. In addition to receiving the mobility event, the Consumer NF-2 also updates the Subscription Correlation ID of the subscription, and the newly Subscription Correlation ID is used in subsequent interaction messages between the New AMF and the Old AMF.

In steps S808 and S809, for the Consumer NF that does not need to be notified after registration, for example, the mobility event generated by a Consumer NF-1 not subscribing and registering, the New AMF needs to send an update message immediately. It is convenient for the Consumer NF to update the Subscription Correlation ID and the NF ID of the provider. This is the same as the corresponding steps S707 and S708 in exemplary embodiment two.

Compared with exemplary embodiment two, the present exemplary embodiment three does not need to send the subscription update message to all Consumer NFs, and may carry the new Subscription Correlation ID and the NF ID of the provider in the event notification message to achieve the purpose of updating the subscription relationship.

Figure 9:
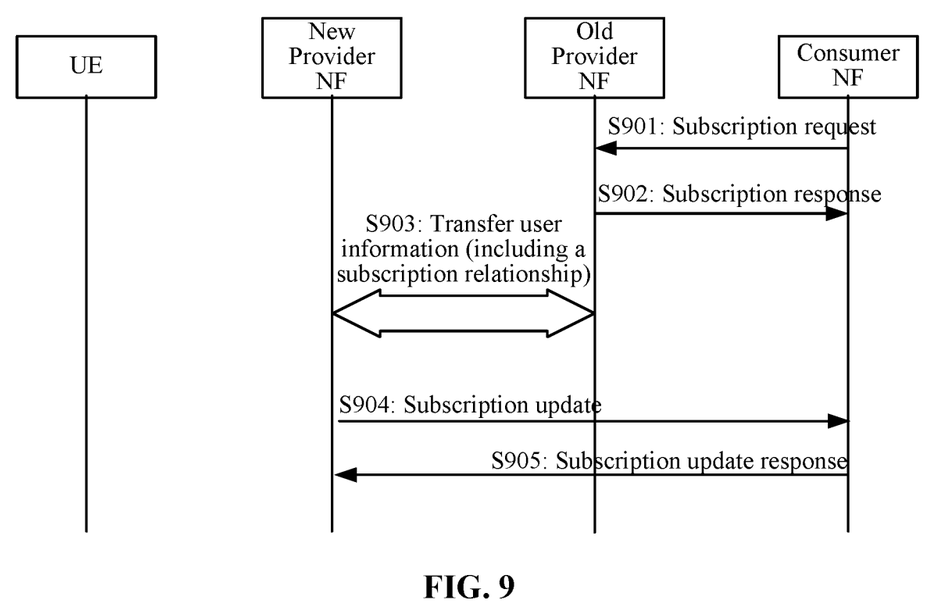
FIG. 9 is a flowchart according to an exemplary embodiment four.

Exemplary embodiment four: a subscription update is used as a common mechanism for an update mechanism after a subscription relationship is transferred across the Provider NF.

FIG. 9 is a flowchart according to an exemplary embodiment four. As shown in FIG. 9, steps below are included.

In step S901, a Consumer NF initiates a subscription request to an Old Provider NF, and the Old AMF has allocated a unique Subscription Correlation ID within this NF for each subscription, where the Provider NF is an AMF, an SMF, a PCF, a UDM, and the like.

In step S902, an Old NF replies a subscription response carrying the allocated Subscription Correlation ID, its own NF ID, etc., to all Consumer NFs. The Consumer NF receives the response, and all subsequent messages will carry the Subscription Correlation ID.

In step S903, due to various reasons such as the movement of a user location, which causes user information to be transferred among NFs, and the Old NF may transfer the user information including a subscription relationship to a New NF. For example, in a handover procedure of across-AMF is initiated by a user.

In steps S904 and S905, the New Provider NF sends a subscription update message to the Consumer NF, and the subscription update message includes but not limited to the Subscription Correlation ID and the NF ID of the Provider.

Figure 10:
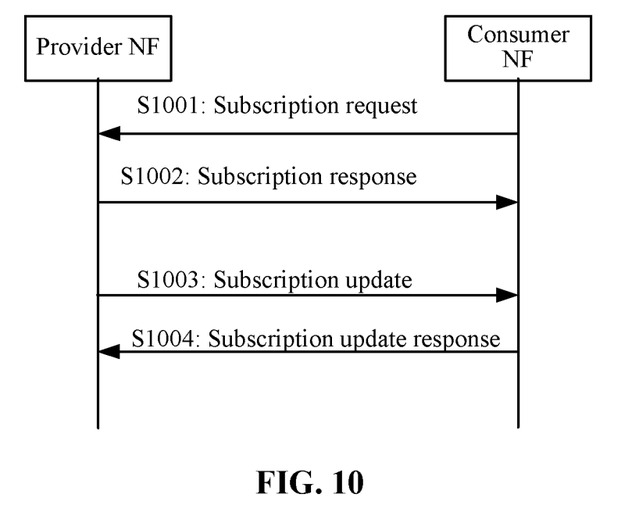
FIG. 10 is a flowchart according to an exemplary embodiment five.

In the present exemplary embodiment four, the subscription update is used as the common mechanism for the update mechanism after the subscription relationship is transferred across the Provider NF. The Provider NF may be the AMF, the SMF, the PCF, the UDM, and the like. The subscription relationship can be transfer among the NFs as long as that user information is transfer among two NFs of the same kind. The subscription update messages can be used by the New NF to notify the Consumer NF to update the subscription information, and the subscription update message includes but not limited to the Subscription Correlation ID and the NF ID of the Provider. Exemplary embodiment five: a subscription update is used as a common mechanism for a Provider NF to actively notify a Consumer NF to update subscription information.

FIG. 10 is a flowchart according to an exemplary embodiment five. As shown in FIG. 10, steps below are included.

In step S1001, the Consumer NF initiates a subscription request to the Provider NF, and the Provider NF is an AMF, the SMF, a PCF, a UDM, and the like.

In step S1002, the Provider NF replies a response to the Consumer NF.

In step S1003, when the Provider NF needs to notify the Consumer NF to update subscription information due to its own capability change or other reasons, the Provider NF sends a subscription update message to the Consumer NF, and the updated contents include, but are not limited to, a Subscription Correlation ID, an NF ID of the provider, a subscribed Event, information of interest to Consumer NF, etc.

In step S1004, the Consumer NF returns a subscription update response to the Provider NF.

From the description of the above-mentioned implementations, it will be apparent to those skilled in the art that the method in the embodiment may be implemented by software plus a necessary general-purpose hardware platform, or may, of course, be implemented by hardware. However, in many cases, the former is a preferred implementation. Based on this understanding, the technical schemes provided by the present disclosure substantially, or the part contributing to the related art, may be embodied in the form of a software product. The computer software product is stored in a storage medium (such as a ROM/a RAM, a magnetic disk or an optical disk) and includes several instructions for enabling terminal equipment (which may be a mobile phone, a computer, a server, network equipment or the like) to perform the method according to each embodiment of the present disclosure.

Embodiment Two

This embodiment further provides an apparatus for updating subscription information. The apparatus is used for implementing the above-mentioned embodiments and preferred embodiments. What has been described will not be repeated. As used below, the term "module" may be software, hardware or a combination thereof capable of implementing predetermined functions. The apparatuses in the embodiment described below are preferably implemented by software, but implementation by hardware or by a combination of software and hardware is also possible and conceived.

According to another embodiment of the present disclosure, an apparatus for updating subscription information is further provided. The apparatus includes a first receiving module, a first sending module and a second receiving module.

The first receiving module is configured to receive first subscription information sent by a second NF, where the first subscription information includes a first correlation identity allocated by the second NF to a first NF.

The first sending module is configured to allocate a second correlation identity to the first NF, and send the second correlation identity to the first NF.

The second receiving module is configured to receive an update subscription message of the first NF, where the update subscription message includes the second correlation identity.

It should be noted that that the above correlation identity may be a subscription correction ID. Through the above steps, after the second NF transfers the first subscription information to the third NF, where the first subscription information includes the first correlation identity allocated by the second NF to the first NF, the third NF allocates the second correlation identity to the first NF. Therefore, the issue of the lack of an update scheme of the subscription information adaptable a new system in the related art is resolved, and the update scheme of the subscription information adaptable the new system is proposed, for example, when across-NF registration of the user terminal is generated, the subscription message is updated between the new third NF and the first NF in time.

Optionally, the second correlation identity is sent to the first NF, and the method includes sending, by the third NF, a first notification message to the first NF, where the first notification message carries the second correlation identity.

Optionally, the second correlation identity is sent to the first NF, and the method includes steps described below. The third NF sends a second notification message to the first NF, where the second notification message is configured to notify the first NF to send re-subscription information to the third NF. The re-subscription information sent by the first NF is received. The third NF sends a subscription response to the first NF according to the re-subscription information, where the subscription response includes the second correlation identity.

Optionally, the first NF includes a consumer NF, the second NF includes a provider NF, and the third NF includes a destination provider NF.

Optionally, the third NF sends at least one piece of information to the first NF, where the information includes an identity (ID) of the third NF, a subscription event in the first subscription information and target content of the first NF indicated by the first subscription information. It should be noted that the target content may be content of interest to the first NF.

Optionally, after the third NF receives the first subscription information sent by the second NF, the second NF cancels a subscription relationship between the first NF and the second NF.

According to another embodiment of the present disclosure, an apparatus for updating subscription information is further provided. The apparatus includes an establishment module, a third receiving module and a second sending module.

The establishment module is configured to establish a subscription relationship with a second NF. The third receiving module is configured to receive a second correlation identity allocated by a third NF, where the third NF allocates the second correlation identity to an NF to which the third receiving module belongs after receiving first subscription information carrying the subscription relationship sent by the second NF.

The second sending module is configured to send an update subscription message to the third NF, where the update subscription message includes the second correlation identity.

Optionally, the first NF receives the second correlation identity allocated by the third NF, and the method includes receiving a first notification message carrying the correlation identity sent by the third NF.

Optionally, the first NF receives the second correlation identity allocated by the third NF, and the method includes steps described below. The first NF receives a second notification message sent by the third NF. Re-subscription information is sent to the third NF according to the second notification message. A subscription response fed back by the third NF according to the re-subscription information is received, where the subscription response includes the second correlation identity.

It is to be noted that the preceding modules may be implemented by software or hardware. Implementation by hardware may, but not necessarily, be performed in the following manner: the preceding modules are located in the same processor or the preceding modules are located in any combination in their respective processors.

Embodiment Three

According to another embodiment of the present disclosure, a storage medium is provided. The storage medium is configured to store a computer program, where the computer program, when executed, executes the method described in any embodiment described above.

Embodiment Four

According to another embodiment of the present disclosure, an electronic apparatus is provided, including a memory and a processor. The memory stores a computer program, and the processor is configured to run the computer program to execute the above-mentioned method.

By the present disclosure, after the second NF transfers the first subscription information to the third NF, where the first subscription information includes the first correlation identity allocated by the second NF to the first NF, the third NF allocates the second correlation identity to the first NF, and the third NF receives update subscription information of the first NF, where the update subscription information includes the second correlation identity. By using the above scheme, the issue of the lack of an update scheme of the subscription information adaptable a new system in the related art is resolved, and the update scheme of the subscription information adaptable the new system is proposed, for example, when across-NF registration of the user terminal is generated, the subscription message is updated between the new third NF and the first NF in time. Apparently, it is to be understood by those skilled in the art that the modules or steps of the present disclosure may be implemented by at least one generic computing device and may be concentrated on a single computing device or distributed in a network formed by multiple computing devices. Optionally, these modules or steps may be implemented by program codes executable by the at least one computing device. Thus, these modules or steps may be stored in a storage medium and executed by the at least one computing device. Moreover, in some cases, the illustrated or described steps may be executed in a sequence different from the sequence described herein. Alternatively, each of these modules or steps may be implemented by being made into an integrated circuit module or multiple ones of these modules or steps may be implemented by being made into a single integrated circuit module. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

What is claimed is:

1. A method for updating subscription information, comprising:
receiving, by a new net function (NF), first subscription information sent by an old NF;
allocating, by the new NF, responsive to receiving the first subscription information sent by the old NF, a new correlation identity to a consumer NF, wherein the consumer NF subscribes to an event of a user equipment (UE);
sending, by the new NF, the new correlation identity to the consumer NF; and
receiving, by the new NF, an update subscription message of the consumer NF, wherein the update subscription message comprises the new correlation identity.

2. The method of claim 1, wherein the step of sending the new correlation identity further comprises sending, by the new NF to the consumer NF, a notification message carrying the new correlation identity.

3. The method of claim 1, wherein the first subscription information comprises an old correlation identity allocated by the old NF to the consumer NF.

4. The method of claim 1, further comprising: sending, by the new NF to the consumer NF, at least one of the following information: an identity (ID) of the new NF, a subscription event in the first subscription information, or target content of the consumer NF indicated by the first subscription information.

5. The method of claim 1, wherein following the step of receiving the first subscription, the method further comprises canceling, by the old NF, a subscription relationship between the consumer NF and the old NF.

6. A method for updating subscription information, comprising:
establishing, by a consumer net function (NF), a subscription relationship with an old NF;
receiving, by the consumer NF, a new correlation identity allocated by a new NF, responsive to the new NF receiving first subscription information carrying the subscription relationship sent by the old NF, wherein the consumer NF subscribes to an event of a user equipment (UE); and
sending, by the consumer NF, an update subscription message to the new NF, wherein the update subscription message comprises the new correlation identity.

7. The method of claim 6, wherein the step of receiving a new correlation identity further comprises receiving, by the consumer NF, a notification message carrying the new correlation identity sent by the new NF.

8. The method of claim 6, further comprising: receiving, by the consumer NF from the new NF, at least one of the following information: an identity (ID) of the new NF, a subscription event in the first subscription information, or target content of the consumer NF indicated by the first subscription information.

9. A device for updating subscription information, comprising a memory and a processor, wherein the memory is configured to store a computer program, and the processor is configured to:
receive, via a new net function (NF), first subscription information sent by an old NF;
allocate, via the new NF responsive to receiving the first subscription information sent by the old NF, a new correlation identity to a consumer NF, wherein the consumer NF subscribes to an event of a user equipment (UE);
send, via the new NF, the new correlation identity to the consumer NF; and
receive, via the new NF, an update subscription message of the consumer NF, wherein the update subscription message comprises the new correlation identity.

10. The device of claim 9, wherein the step of sending the new correlation identity further comprises sending, by the new NF to the consumer NF, a notification message carrying the new correlation identity.

11. The device of claim 9, wherein the first subscription information comprises an old correlation identity allocated by the old NF to the consumer NF.

12. The device of claim 9, wherein the processor is further configured to send, via the new NF to the consumer NF, at least one of the following information: an identity (ID) of the new NF, a subscription event in the first subscription information, or target content of the consumer NF indicated by the first subscription information.

13. The device of claim 9, wherein the processor is further configured to cancel, via the old NF, a subscription relationship between the consumer NF and the old NF, following the step of receiving the first subscription.

14. A device for updating subscription information, comprising a memory and a processor, wherein the memory is configured to store a computer program, and the processor is configured to execute:

establish, via a consumer net function (NF), a subscription relationship with an old NF;

receive, via the consumer NF, a new correlation identity allocated by a new NF, responsive to the new NF receiving first subscription information carrying the subscription relationship sent by the old NF, wherein the consumer NF subscribes to an event of a user equipment (UE); and send, via the consumer NF, an update subscription message to the new NF, wherein the update subscription message comprises the new correlation identity.

15. The device of claim 14, wherein the processor is further configured to receive, via the consumer NF, a notification message carrying the new correlation identity sent by the new NF.

16. The device of claim 14, wherein the processor is further configured to receive, via the consumer NF from the new NF, at least one of the following information: an identity (ID) of the new NF, a subscription event in the first subscription information, or target content of the consumer NF indicated by the first subscription information.

* * * * *